(12) United States Patent
Ishii (10) Patent No.: US 10,919,460 B2
(45) Date of Patent: Feb. 16, 2021

(54) VEHICLE

(71) Applicant: TOYOTA JIDOSHA KABUSHIKI KAISHA, Aichi-ken (JP)

(72) Inventor: Naoyuki Ishii, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 20 days.

(21) Appl. No.: 16/259,970

(22) Filed: Jan. 28, 2019

(65) Prior Publication Data
US 2019/0256013 A1     Aug. 22, 2019

(30) Foreign Application Priority Data
Feb. 21, 2018   (JP) .............................. JP2018-029045

(51) Int. Cl.
| | | |
|---|---|---|
| *B60R 13/08* | (2006.01) | |
| *B62D 25/14* | (2006.01) | |
| *G10K 11/168* | (2006.01) | |

(52) U.S. Cl.
CPC .............. *B60R 13/08* (2013.01); *B62D 25/14* (2013.01); *G10K 11/168* (2013.01); *B60R 13/0823* (2013.01)

(58) Field of Classification Search
CPC ... B60R 13/08; B60R 13/083; B60R 13/0815; G10K 11/162; G10K 11/168
(Continued)

(56) References Cited

U.S. PATENT DOCUMENTS

| | | | | |
|---|---|---|---|---|
| 5,817,408 A | * | 10/1998 | Orimo ..................... | B32B 27/12 428/218 |
| 2017/0259757 A1 | * | 9/2017 | Godano ................. | B60N 3/042 |

FOREIGN PATENT DOCUMENTS

| | | | |
|---|---|---|---|
| CN | 102529840 | * | 7/2012 |
| DE | 2732483 | * | 2/1979 |

(Continued)

OTHER PUBLICATIONS

Translation of Teroson document, De 2732483 (Year: 1977).*
Unpublished U.S. Appl. No. 16/376,409, filed Apr. 5, 2019.

*Primary Examiner* — Dennis H Pedder
(74) *Attorney, Agent, or Firm* — Hauptman Ham, LLP (57) ABSTRACT

A vehicle is provided that includes a dash panel that partitions a power unit room, arranged on a vehicle front side and a vehicle interior from each other, an instrument panel that covers the dash panel from a vehicle rear side and at a portion of which, on a driving seat side and a vehicle lower side an opening section through which an arm section of a pedal is insertable is formed, and a sound insulating section that is installed along a surface on the vehicle rear side of the dash panel, in which the sound insulating section includes a driving seat side sound insulating section that is configured including a driving seat side sound absorbing material that is arranged along a portion on the driving seat side of the dash panel and is made of an elastically deformable material and a high density material that is arranged along and closely attached to a surface on the vehicle rear side of the driving seat side sound absorbing material and is made of a material that has a higher density than the material of the driving seat side sound absorbing material, and a front passenger seat side sound insulating section that is configured with one or more sound absorbing materials that are arranged along a portion on a front passenger seat side of the dash panel, in which a number of sheets of the sound absorbing materials arranged in a plate thickness direction of the dash panel is set at a number less than or equal to a number of sheets of sound absorbing materials included in the driving seat side sound insulating section.

10 Claims, 8 Drawing Sheets

(58) Field of Classification Search
USPC .......................................................... 296/39.3
See application file for complete search history.

(56) References Cited

FOREIGN PATENT DOCUMENTS

| | | |
|---|---|---|
| JP | H11-180224 A | 7/1999 |
| JP | 2009-18746 A | 1/2009 |

* cited by examiner

VEHICLE

CROSS-REFERENCE TO RELATED APPLICATION

This application is based on and claims priority under 35 USC 119 from Japanese Patent Application No. 2018-029045 filed on Feb. 21, 2018, the disclosure of which is incorporated by reference herein.

BACKGROUND

Technical Field

The present invention relates to a vehicle.

Related Art

Countermeasures against noise in the interior of a vehicle include various types of measures, and, for example, Japanese Patent Application Laid-Open (JP-A) No. 2009-018746 discloses an invention relating to a sound insulating material for a vehicle. The sound insulating material for a vehicle has an insulator dash installed along a surface on the vehicle interior side of a dash panel, and the insulator dash includes a layered sound absorbing layer that is configured including a base sound absorbing layer that has a porous sound absorbing function and a resin foam sheet that is formed in one body with the base sound absorbing layer on a surface on the vehicle interior side of the base sound absorbing layer. At a site in the insulator dash where a sound pressure level of sound mainly including noise in a low frequency range is high, a sound insulation layer that has a sound insulation function is installed on a portion of a surface of the layered sound absorbing layer. Thus, the prior art described above can suppress noise over a wide range of levels and from a low frequency range to a high frequency range.

An instrument panel that is arranged on the vehicle front side of a vehicle interior has different configurations between the driving seat side and the front passenger seat side. Specifically, while an opening section through which pedals and the like are inserted is formed on the driving seat side of the instrument panel, no such an opening section is formed on the front passenger seat side of the instrument panel. In other words, in the prior art described above, although relatively high sound insulation performance is required for a portion on the driving seat side of the insulator dash when sound leakage and the like from the opening section of the instrument panel are taken into consideration, sound insulation performance as high as that of the portion on the driving seat side of the insulator dash is not required for a portion on the front passenger seat side of the insulator dash.

However, in the prior art described above, since the insulator dash has similar configurations on the driving seat side and the front passenger seat side thereof, the portion on the front passenger seat side of the insulator dash has excessive quality in terms of the sound insulation performance. In other words, the prior art described above has room for improvement in, while suppressing noise in the vehicle interior from occurring, suppressing excessive quality from being produced, by appropriately arranging members used for sound insulation.

SUMMARY

In consideration of the above facts, an object of the invention is to provide a vehicle that is capable of, while suppressing noise in a vehicle interior from occurring, suppressing excessive quality from being produced, by appropriately arranging members used for sound insulation.

A vehicle according to a first aspect of the invention includes a dash panel that partitions a power unit room, arranged on a vehicle front side, and a vehicle interior from each other, an instrument panel that covers the dash panel from a vehicle rear side and at a portion of which, on a driving seat side and a vehicle lower side, an opening section through which an arm section of a pedal is insertable is formed, and a sound insulating section that is installed along a surface on the vehicle rear side of the dash panel, in which the sound insulating section includes a driving seat side sound insulating section that is configured including a driving seat side sound absorbing material that is arranged along a portion on the driving seat side of the dash panel and is made of an elastically deformable material, and a high density material that is arranged along and closely attached to a surface on the vehicle rear side of the driving seat side sound absorbing material and is made of a material that has a higher density than the material of the driving seat side sound absorbing material, and a front passenger seat side sound insulating section that is configured with one or more sound absorbing materials that are arranged along a portion on a front passenger seat side of the dash panel, in which a number of sheets of the sound absorbing materials arranged in a plate thickness direction of the dash panel is set at a number less than or equal to a number of sheets of sound absorbing materials included in the driving seat side sound insulating section.

According to the vehicle according to the first aspect of the invention, the power unit room arranged on the vehicle front side and the vehicle interior are partitioned from each other by the dash panel and, to the surface on the vehicle rear side of the dash panel, the sound insulating section is installed along the surface. Thus, the sound insulating section can suppress noise from the power unit room from leaking into the vehicle interior.

The vehicle rear side of the dash panel is covered by the instrument panel, and, at a portion on the driving seat side and the vehicle lower side of the instrument panel, an opening section through which the arm section of the pedal is insertable is formed. Thus, a portion on the base end section side of the pedal can be housed inside the instrument panel.

While the opening section through which the arm section of the pedal is insertable is formed on a portion on the driving seat side of the instrument panel, no such an opening section is formed on a portion on the front passenger seat side of the instrument panel. In other words, although relatively high sound insulation performance is required for a portion on the driving seat side of the sound insulating section when sound leakage and the like from the opening section of the instrument panel is taken into consideration, sound insulation performance as high as that of the portion on the driving seat side of the sound insulating section is not required for a portion on the front passenger seat side of the sound insulating section. In a case that the sound insulating section has the same configuration on the driving seat side and the front passenger seat side thereof, the portion on the front passenger seat side of the sound insulating section sometimes comes to have excessive quality in terms of the sound insulation performance.

In the aspect, the sound insulating section includes the driving seat side sound insulating section and the front passenger seat side sound insulating section, and the sound insulating section has different sound insulation performances between the driving seat side and the front passenger seat side. Specifically, the driving seat side sound insulating section is configured including the driving seat side sound absorbing material that is arranged along the portion on the driving seat side of the dash panel and therewith is made of an elastically deformable material and the high density material that is arranged along and closely attached to the surface on the vehicle rear side of the driving seat side sound absorbing material and therewith is made of a material that has a higher density than the material of the driving seat side sound absorbing material.

Thus, when viewing the driving seat side sound insulating section microscopically, it can be considered that a vibration system (spring-mass system) in which a portion of the driving seat side sound absorbing material functions as a spring and, therewith, a portion of the high density material functions as a mass is constituted, and, when viewing the driving seat side sound insulating section as a whole, it can be considered that a plurality of such vibration systems are arranged in parallel with one another. The vibration systems each of which a portion of the driving seat side sound absorbing material and a portion of the high density material constitute are excited by noise from the power unit room. In other words, a portion of energy that the noise from the power unit room has is converted to mechanical energy of the vibration systems described above.

Resistance force due to self-weight (gravitational acceleration) and the like of the high density material is exerted on the vibration systems, and vibration of the vibration systems excited by the energy, which the noise from the power unit room has, is attenuated by the resistance force. As a result, absorption performance of the noise from the power unit room can be increased at the portion on the driving seat side of the dash panel, as a result of which the noise from the power unit room can be suppressed from leaking via the opening section of the instrument panel.

The front passenger seat side sound insulating section is configured with one or more sound absorbing materials that are arranged along a portion on the front passenger seat side of the dash panel. The number of sheets of sound absorbing materials that constitute the front passenger seat side sound insulating section and that are arranged in the plate thickness direction of the dash panel is set at a number less than or equal to the number of sheets of sound absorbing materials that constitute the driving seat side sound insulating section and that are arranged in the same manner. Thus, at the portion on the front passenger seat side of the dash panel, it is possible, while securing a certain level of sound insulation performance, to make the configuration of the front passenger seat side sound insulating section simpler than the configuration of the driving seat side sound insulating section.

A vehicle according to a second aspect of the invention is configured such that, in the vehicle according to the first aspect, the front passenger seat side sound insulating section is configured with a first front passenger seat side sound absorbing material that is closely attached to the surface on the vehicle rear side of the dash panel and a second front passenger seat side sound absorbing material that is closely attached to a surface on the vehicle rear side of the first front passenger seat side sound absorbing material, the driving seat side sound insulating section further includes a rear side sound absorbing material that is arranged along and closely attached to a surface on the vehicle rear side of the high density material, the first front passenger seat side sound absorbing material is formed in one body with the driving seat side sound absorbing material, and the second front passenger seat side sound absorbing material is formed in one body with the rear side sound absorbing material.

According to the vehicle according to the second aspect of the invention, the front passenger seat side sound insulating section is configured with the first front passenger seat side sound absorbing material, which is closely attached to the surface on the vehicle rear side of the dash panel, and the second front passenger seat side sound absorbing material, which is closely attached to the surface on the vehicle rear side of the first front passenger seat side sound absorbing material. Thus, it is possible to increase absorption performance of noise by the front passenger seat side sound insulating section to a higher level than that by a configuration in which the front passenger seat side sound insulating section is configured with one sheet of sound absorbing material.

The driving seat side sound insulating section includes the rear side sound absorbing material, which is arranged along and closely attached to the surface on the vehicle rear side of the high density material, and the rear side sound absorbing material can absorb noise from the power unit room that the driving seat side sound absorbing material and the high density material failed to completely absorb.

In the aspect, the first front passenger seat side sound absorbing material and the driving seat side sound absorbing material are formed in one body, and the second front passenger seat side sound absorbing material and the rear side sound absorbing material are formed in one body. This configuration enables the number of man-hours required for installation of the sound insulating section to be reduced in comparison with a configuration in which all of the first front passenger seat side sound absorbing material, the driving seat side sound absorbing material, the second front passenger seat side sound absorbing material, and the rear side sound absorbing material are formed as separate bodies.

A vehicle according to a third aspect of the invention is configured such that, in the vehicle according to the first or second aspect, the driving seat side sound absorbing material is made of formed foam.

According to the vehicle according to the third aspect of the invention, since the driving seat side sound absorbing material is made of formed foam, it is possible to suppress the driving seat side sound absorbing material from collapsing upon installation and the like of the sound insulating section better than a configuration in which the driving seat side sound absorbing material is made of a material such as a fibrous material.

A vehicle according to a fourth aspect of the invention includes a dash panel that partitions a power unit room, arranged on a vehicle front side, and a vehicle interior from each other, an instrument panel that is arranged on a vehicle rear side of the dash panel and at a portion of which, on a driving seat side and a vehicle lower side, an opening section through which an arm section of a pedal is insertable is formed, and a sound insulating section that is installed along a surface on the vehicle rear side of the dash panel, in which the sound insulating section includes a front passenger seat side sound insulating section that is configured with a sound absorbing material arranged along a portion on a front passenger seat side of the dash panel, and a driving seat side sound insulating section that is configured with a sound absorbing material arranged along a portion on the driving seat side of the dash panel and a thickness of which in a plate thickness direction of the dash panel is set to be thicker than the front passenger seat side sound insulating section.

According to the vehicle according to the fourth aspect of the invention, a basic configuration is set to be a similar configuration to the configuration of the vehicle according to the first aspect of the invention, as a result of which the sound insulating section can suppress noise from the power unit room from leaking into the vehicle interior.

In the aspect, the front passenger seat side sound insulating section is configured with a sound absorbing material that is arranged along the portion on the front passenger seat side of the dash panel. The driving seat side sound insulating section is configured with a sound absorbing material that is arranged along the portion on the driving seat side of the dash panel, and, therewith, a thickness of the sound absorbing material in the plate thickness direction of the dash panel is set to be thicker than a thickness of the front passenger seat side sound insulating section in the plate thickness direction of the dash panel. Thus, it becomes easier for the driving seat side sound insulating section to absorb sound with a long wavelength, that is, low frequency sound, than for the front passenger seat side sound insulating section, as a result of which it is possible to suppress low frequency noise from leaking from the opening section of the instrument panel. In addition, making the front passenger seat side sound insulating section thinner than the driving seat side sound insulating section enables the amount of sound absorbing material required for constituting the front passenger seat side sound insulating section to be smaller than the amount of sound absorbing material required for constituting the driving seat side sound insulating section.

A vehicle according to a fifth aspect of the invention is configured such that, in the vehicle according to the first or fourth aspect, the driving seat side sound insulating section includes a first driving seat side sound absorbing material that is closely attached to the surface on the vehicle rear side of the dash panel and that is made of an elastically deformable material and a second driving seat side sound absorbing material that is closely attached to a surface on the vehicle rear side of the first driving seat side sound absorbing material and that is made of a material that has a higher density than the material of the first driving seat side sound absorbing material.

According to the vehicle according to the fifth aspect of the invention, the driving seat side sound insulating section includes the first driving seat side sound absorbing material, which is closely attached to the surface on the vehicle rear side of the dash panel, and the second driving seat side sound absorbing material, which is closely attached to the surface on the vehicle rear side of the first driving seat side sound absorbing material. Thus, adjustment of the thickness of each of the first driving seat side sound absorbing material and the second driving seat side sound absorbing material enables a frequency band of sound that the driving seat side sound insulating section can absorb to be tuned to a frequency band of noise from the power unit room more easily than in a case in which the driving seat side sound insulating section is configured with one sheet of sound absorbing material.

The first driving seat side sound absorbing material is made of an elastically deformable material, and the second driving seat side sound absorbing material is made of a material that has a higher density than the material of the first driving seat side sound absorbing material. Thus, when viewing the driving seat side sound insulating section microscopically, it can be considered that a vibration system in which a portion of the first driving seat side sound absorbing material functions as a spring and, therewith, a portion of the second driving seat side sound absorbing material functions as a mass is constituted, and, when viewing the driving seat side sound insulating section as a whole, it can be considered that a plurality of such vibration systems are arranged in parallel with one another.

The vibration systems, constituted by a portion of the first driving seat side sound absorbing material and a portion of the second driving seat side sound absorbing material, are excited by noise from the power unit room, and a portion of energy that the noise has is converted to mechanical energy of the vibration systems. Resistance force due to self-weight and the like of the second driving seat side sound absorbing material is exerted on the vibration systems, and vibration of the vibration systems excited by the energy, which the noise from the power unit room has, is attenuated by the resistance force.

As described thus far, the vehicle according to the first aspect of the invention has an advantageous effect of being able to, while suppressing noise in the vehicle interior from occurring, suppress excessive quality of members used for sound insulation from being produced, by appropriately arranging the members.

The vehicle according to the second aspect of the invention has an advantageous effect of being able to, while further reducing occurrence of noise in the vehicle interior, suppress assembly work of the vehicle interior from complicating.

The vehicle according to the third aspect of the invention has an advantageous effect of being able to suppress sound insulation performance of the sound insulating section from being reduced.

The vehicle according to the fourth aspect of the invention has a similar advantageous effect to the advantageous effect of the vehicle according to the first aspect of the invention.

The vehicle according to the fifth aspect of the invention has an advantageous effect of being able to absorb noise in a vehicle interior over a wide range of frequency band.

BRIEF DESCRIPTION OF THE DRAWINGS

Exemplary embodiments of the invention will be described in detail based on the following figures, wherein.

DETAILED DESCRIPTION

First Embodiment

Hereinafter, a vehicle according to a first embodiment will be described using FIGS. 1 to 5. Arrows FR, UP, and OUT that are appropriately illustrated in the respective drawings indicate the vehicle front side, the vehicle upper side, and an outer side in the vehicle width direction, respectively.

Figure 5:
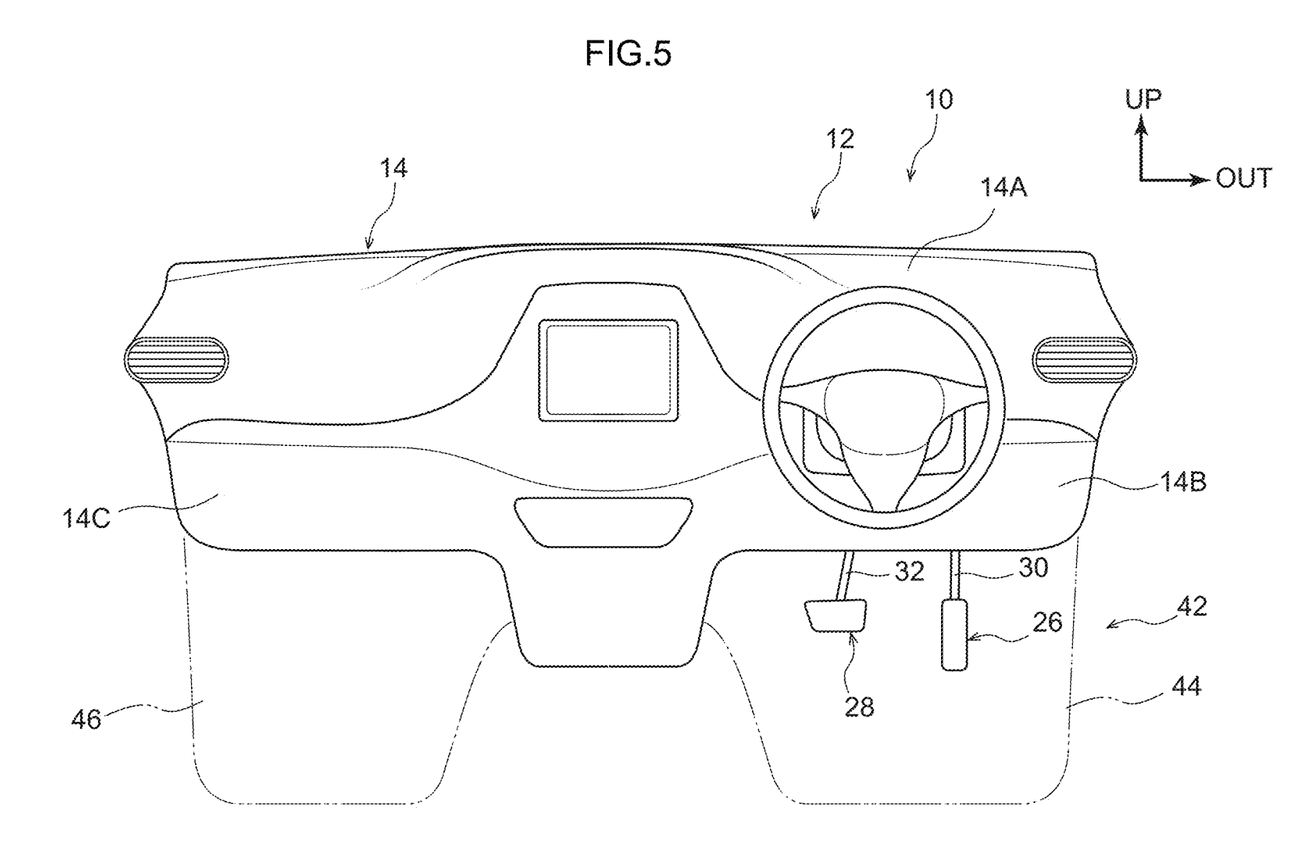
FIG. 5 is a front view viewed from the vehicle rear side schematically illustrating a configuration of a portion on a vehicle front side of a vehicle interior of the vehicle according to the first embodiment.

As illustrated in FIG. 5, a vehicle 10 according to the embodiment is assumed to be a right-hand drive vehicle and an instrument panel 14 is arranged at a portion on the vehicle front side of a vehicle interior 12 of the vehicle 10. The instrument panel 14 is configured including an instrument panel upper 14A that constitutes a portion on the vehicle upper side of the instrument panel 14 and therewith extends in the vehicle width direction and the vehicle longitudinal direction, an instrument panel lower 14B that is disposed facing a not-illustrated driving seat, and an instrument panel lower 14C that is disposed facing a not-illustrated front passenger seat.

Figure 1:
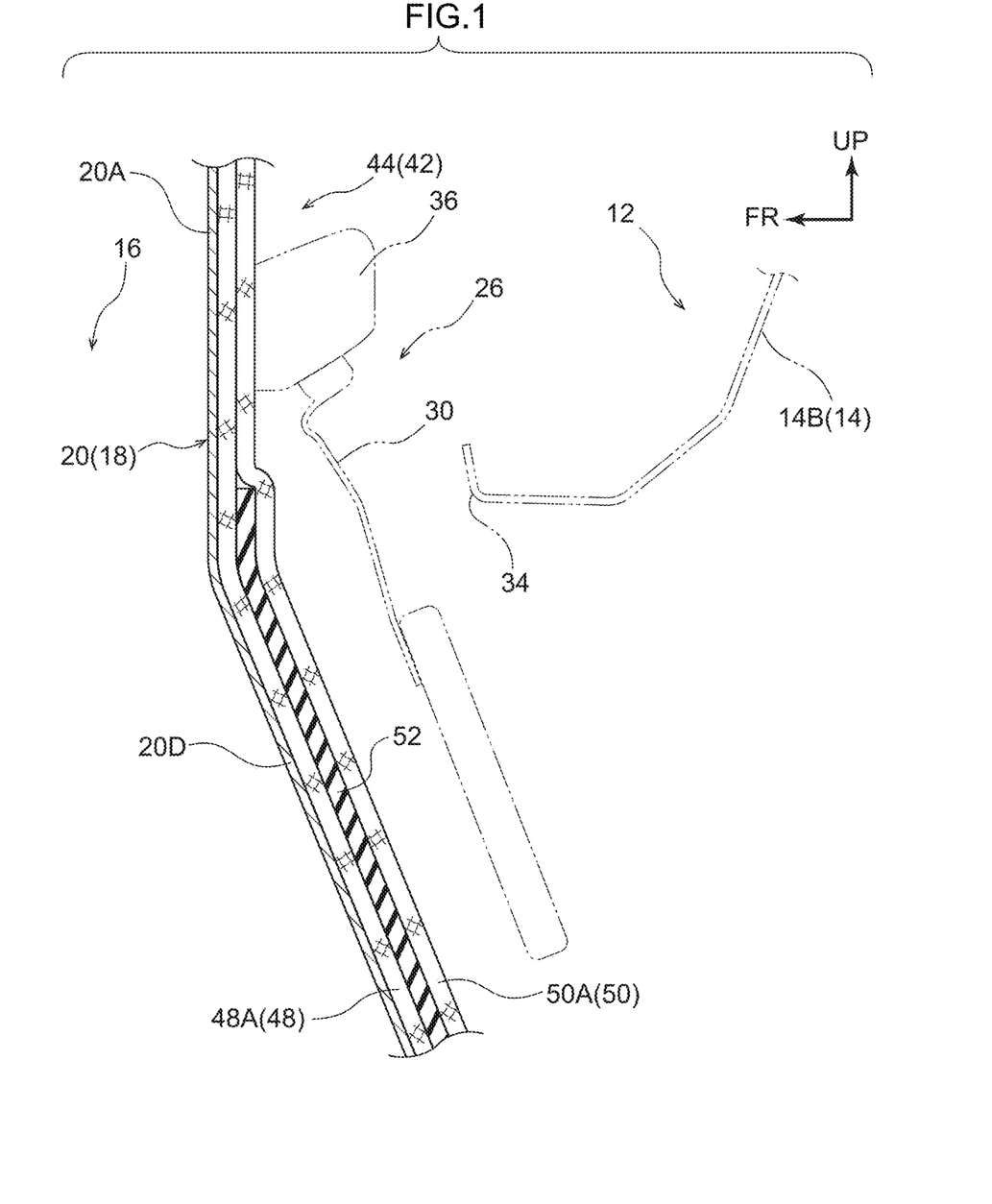
FIG. 1 is an enlarged cross-sectional view (a cross-sectional view taken along a line 1-1 in FIG. 4) viewed from the vehicle width direction illustrating a configuration of a vicinity of a portion on a driving seat side of a dash panel of a vehicle according to a first embodiment.

In a portion on the vehicle front side of the vehicle 10, a power unit room 16 in which a not-illustrated power unit, such as an engine and/or a motor, is housed is disposed, as illustrated in FIG. 1. On the vehicle front side from the instrument panel 14, a dash panel 20 that constitutes a vehicle body 18 of the vehicle 10 is arranged, and the dash panel 20 partitions the power unit room 16 and the vehicle interior 12 from each other.

Figure 4:
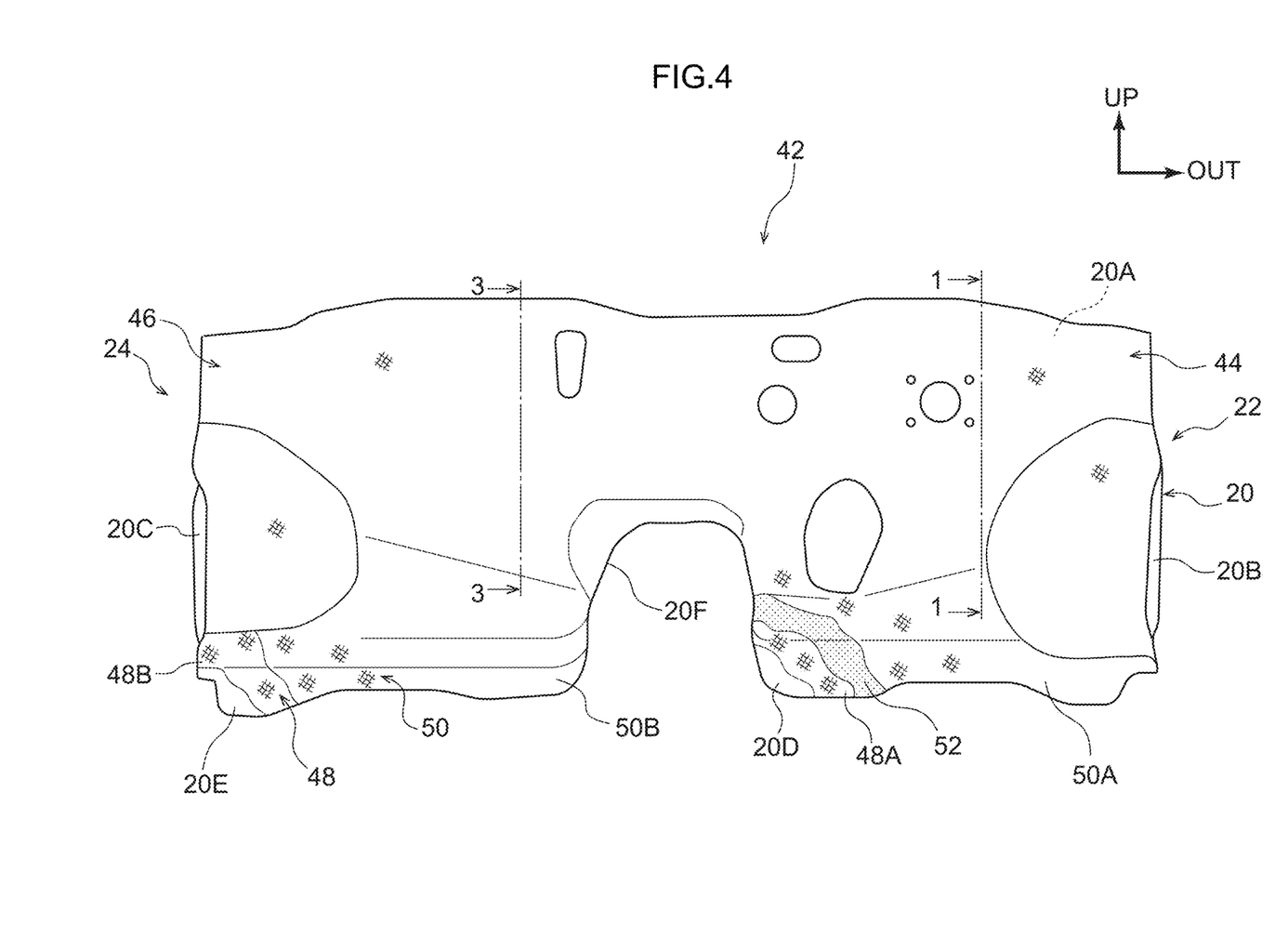
FIG. 4 is a front view viewed from a vehicle rear side schematically illustrating a configuration of the dash panel of the vehicle according to the first embodiment.

The dash panel 20 is formed by press-forming a steel plate and, as illustrated in FIG. 4, is configured including an upper wall section 20A, side sections 20B and 20C, and lower wall sections 20D and 20E. The upper wall section 20A constitutes a portion on the vehicle upper side of the dash panel 20 and therewith extends in the vehicle width direction and the vehicle vertical direction with the plate thickness direction aligned with the vehicle longitudinal direction.

The side section 20B constitutes a portion on one side (the driving seat side) in the vehicle width direction of the dash panel 20 and is extended toward the vehicle rear side from a peripheral section on one side in the vehicle width direction and the vehicle lower side of the upper wall section 20A. The side section 20B is formed into a shape that convexly bulges toward the inner side in the vehicle width direction and constitutes a wheel house 22 in which a not-illustrated front wheel on the driving seat side is housed.

The side section 20C constitutes a portion on the other side (the front passenger seat side) in the vehicle width direction of the dash panel 20 and is extended toward the vehicle rear side from a peripheral section on the other side in the vehicle width direction and the vehicle lower side of the upper wall section 20A. The side section 20C is formed into a shape that convexly bulges toward the inner side in the vehicle width direction and constitutes a wheel house 24 in which a not-illustrated front wheel on the front passenger seat side is housed.

The lower wall section 20D is extended toward the vehicle rear and lower side from a portion on one side in the vehicle width direction of a peripheral section on the vehicle lower side of the upper wall section 20A and therewith has a portion on one side in the vehicle width direction thereof connecting with the side section 20B. The lower wall section 20E is extended toward the vehicle rear and lower side from a portion on the other side in the vehicle width direction of a peripheral section on the vehicle lower side of the upper wall section 20A and therewith has a portion on the other side in the vehicle width direction thereof connecting with the side section 20C.

The lower wall sections 20D and 20E are separated from each other in the vehicle width direction, which causes the dash panel 20 to be in a state of having, at a middle section in the vehicle width direction thereof, an opening section 20F formed that is opened toward the vehicle lower side when viewed from the vehicle longitudinal direction. To the opening section 20F of the dash panel 20, a not-illustrated floor tunnel section that constitutes the vehicle body 18 is connected.

The dash panel 20, which is configured as described above, has the upper wall section 20A, the side sections 20B and 20C, and portions on the vehicle upper side of the lower wall sections 20D and 20E thereof covered by the instrument panel 14 from the vehicle rear side when viewed from the vehicle rear side.

As illustrated in FIGS. 1 and 5, an accelerator pedal 26 and a brake pedal 28 that serve as pedals are installed on a portion on one side in the vehicle width direction of the dash panel 20. The accelerator pedal 26 and the brake pedal 28 are respectively of a suspended type, and an arm section 30 of the accelerator pedal 26 and an arm section 32 of the brake pedal 28 are respectively in a state of being inserted into an opening section 34 that is formed at a portion on the vehicle lower side of the instrument panel lower 14B. A housing 36 of the accelerator pedal 26 and a not-illustrated housing of the brake pedal 28 are arranged inside the instrument panel 14, and portions on base end section sides of the accelerator pedal 26 and the brake pedal 28 are in a state of being housed inside the instrument panel 14.

Figure 3:
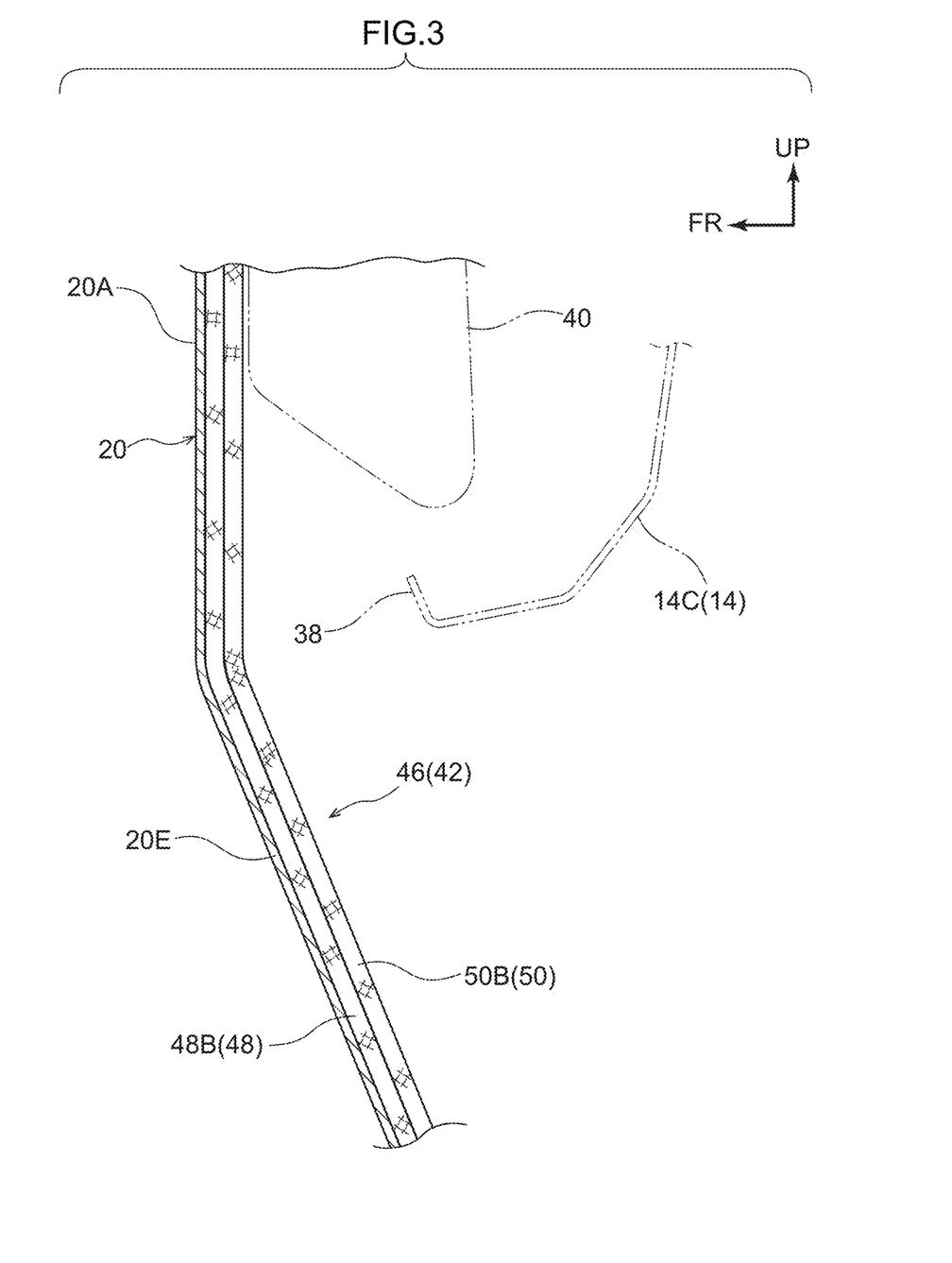
FIG. 3 is an enlarged cross-sectional view (a cross-sectional view taken along a line 3-3 in FIG. 4) viewed from a vehicle width direction illustrating a configuration of a vicinity of a portion on a front passenger seat side of the dash panel of the vehicle according to the first embodiment.

As illustrated in FIG. 3, an opening section 38 is formed at a portion on the vehicle lower side of the instrument panel lower 14C, and opening area of the opening section 38 is set to be smaller than opening area of the opening section 34. On the inside beyond the opening section 38 when viewed from the vehicle lower side, a vent section of an air conditioning unit 40 that is installed inside the instrument panel 14 is arranged.

The embodiment is characterized by a configuration of a sound insulating section 42 that is installed along a surface on the vehicle rear side of the dash panel 20. Hereinafter, a configuration of the sound insulating section 42 will be described in detail using FIGS. 1 to 4. In the following description, it is assumed that a portion on one side and a portion on the other side in the vehicle width direction of the sound insulating section 42 are referred to as a driving seat side sound insulating section 44 and a front passenger seat side sound insulating section 46, respectively.

As illustrated in FIG. 4, the sound insulating section 42 is configured including a first sound absorbing material 48, a second sound absorbing material 50, and a high density material 52 that are layered in the plate thickness direction of the dash panel 20. The first sound absorbing material 48 is formed into a shape that can be arranged along substantially the whole of the surface on the vehicle rear side of the dash panel 20 by compressing a fibrous material made of an elastically deformable material, such as felt (non-woven fabric). The first sound absorbing material 48 is arranged along the surface on the vehicle rear side of the dash panel 20 and therewith is adhered to the surface by a not-illustrated adhesive or the like. In the following description, it is assumed that a portion on one side and a portion on the other side in the vehicle width direction of the first sound absorbing material 48 are referred to as a driving seat side sound absorbing material 48A and a first front passenger seat side sound absorbing material 48B, respectively.

The second sound absorbing material 50 is basically configured to have the same composition as the first sound absorbing material 48 and, as illustrated in FIG. 3, has a portion on the other side in the vehicle width direction thereof, while being closely attached to a surface on the vehicle rear side of the first front passenger seat side sound absorbing material 48B, adhered to the first front passenger seat side sound absorbing material 48B by a not-illustrated adhesive or the like. A portion on one side in the vehicle width direction of the second sound absorbing material 50 is arranged along a surface on the vehicle rear side of the driving seat side sound absorbing material 48A with the high density material 52 interposed between the second sound absorbing material 50 and the driving seat side sound absorbing material 48A, as illustrated in FIG. 1. In the following description, it is assumed that a portion on one side and a portion on the other side in the vehicle width direction of the second sound absorbing material 50 are referred to as a rear side sound absorbing material 50A and a second front passenger seat side sound absorbing material 50B, respectively.

The high density material 52 is made of a material that has a higher density than the materials of the first sound absorbing material 48 and the second sound absorbing material 50, specifically a resin material including olefin resin, and, as illustrated in FIG. 1, is formed into a shape that can be arranged along substantially the whole of a surface on the vehicle rear side of the lower wall section 20D of the dash panel 20. The high density material 52, while being arranged along and closely attached to the surface on the vehicle rear side of the driving seat side sound absorbing material 48A, is adhered to the driving seat side sound absorbing material 48A by a not-illustrated adhesive or the like. To a surface on the vehicle rear side of the high density material 52, the rear side sound absorbing material 50A, while being arranged along and closely attached to the surface, is adhered by a not-illustrated adhesive or the like. An edge section on the vehicle upper side of the high density material 52 is positioned further on the vehicle upper side than an edge section of the opening section 34 of the instrument panel 14 (a lower edge section of the instrument panel lower 14B) when viewed from the vehicle longitudinal direction.

In the sound insulating section 42 configured as described above, the driving seat side sound insulating section 44 is configured to have a three-layer structure in which the driving seat side sound absorbing material 48A, the high density material 52, and the rear side sound absorbing material 50A are arranged in this order from the side where the dash panel 20 is located. The front passenger seat side sound insulating section 46 is configured to have a two-layer structure in which the first front passenger seat side sound absorbing material 48B and the second front passenger seat side sound absorbing material 50B are arranged in this order from the side where the dash panel 20 is located. In the embodiment, the second sound absorbing material 50 constitutes a design surface of the sound insulating section 42.

(Operation and Advantageous Effects of Embodiment)

Next, an operation and advantageous effects of the embodiment will be described.

In the embodiment, the power unit room 16, which are arranged on the vehicle front side, and the vehicle interior 12 are partitioned from each other by the dash panel 20 and, to the surface on the vehicle rear side of the dash panel 20, the sound insulating section 42 is installed along the surface, as illustrated in FIG. 1. This configuration enables the sound insulating section 42 to suppress noise from the power unit room 16 from leaking into the vehicle interior 12.

On a portion on the driving seat side of the instrument panel 14, the opening section 34, through which the arm section 30 of the accelerator pedal 26 and the arm section 32 of the brake pedal 28 can be inserted, is formed. In FIG. 1, the brake pedal 28 is not illustrated in order to facilitate understanding of a configuration in a vicinity of the opening section 34.

On the other hand, the opening section 34 is not formed on a portion on the front passenger seat side of the instrument panel 14. In other words, while a relatively high sound insulation performance is required for a portion on the driving seat side of the sound insulating section 42 when sound leakage and the like from the opening section 34 of the instrument panel 14 is taken into consideration, sound insulation performance as high as that of the portion on the driving seat side of the sound insulating section 42 is not required for a portion on the front passenger seat side of the sound insulating section 42. In a case that the sound insulating section 42 has the same configuration on the driving seat side and the front passenger seat side thereof, the portion on the front passenger seat side of the sound insulating section 42 sometimes comes to have excessive quality in terms of the sound insulation performance.

In the embodiment, the sound insulating section 42 includes the driving seat side sound insulating section 44 and the front passenger seat side sound insulating section 46 as illustrated in FIG. 4 and has different sound insulation performances between the driving seat side and the front passenger seat side. Specifically, the driving seat side sound insulating section 44 is configured including the driving seat side sound absorbing material 48A, which is arranged along a portion on the driving seat side of the dash panel 20 and therewith is made of an elastically deformable material, and the high density material 52, which is arranged along and closely attached to the surface on the vehicle rear side of the driving seat side sound absorbing material 48A and therewith is made of a material that has a higher density than the material of the driving seat side sound absorbing material 48A.

Figure 2:
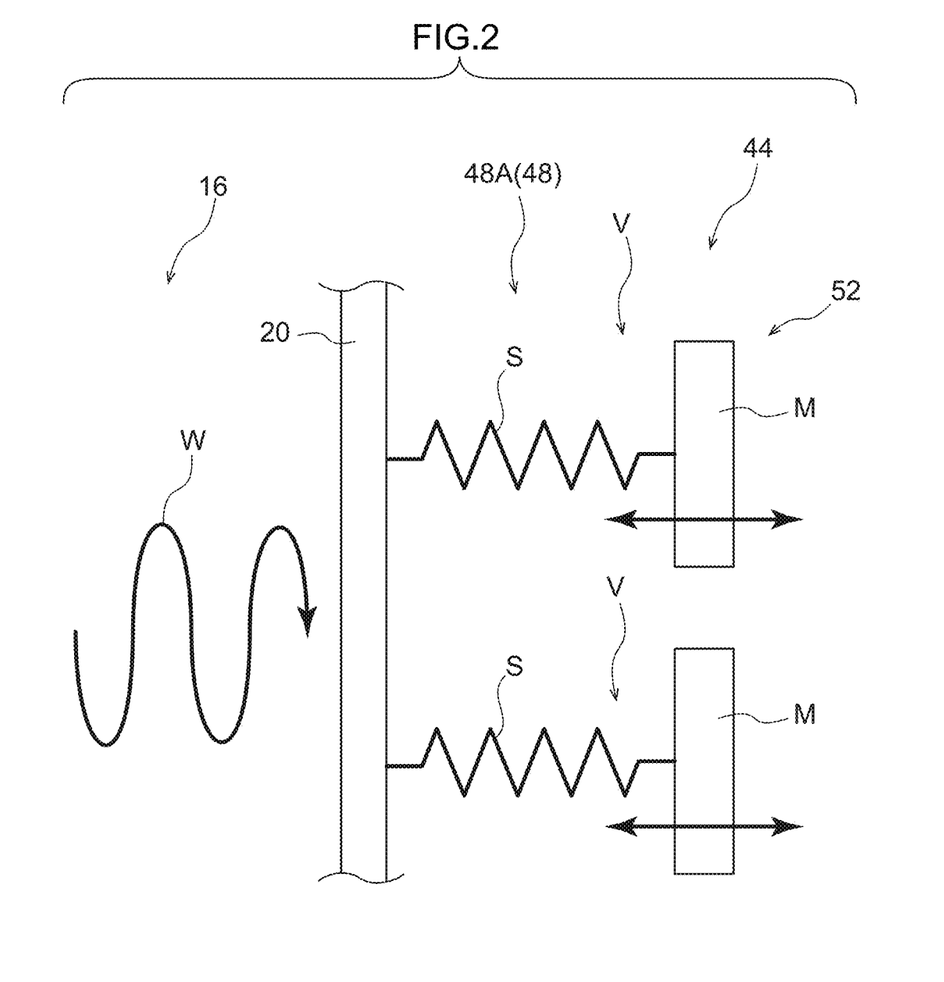
FIG. 2 is a schematic diagram schematically illustrating a configuration of a vicinity of the portion on the driving seat side of the dash panel of the vehicle according to the first embodiment.

Thus, as illustrated in FIG. 2, when viewing the driving seat side sound insulating section 44 microscopically, it can be considered that a vibration system V (spring-mass system) in which a minute portion (a part) of the driving seat side sound absorbing material 48A functions as a spring S and, therewith, a minute portion (a part) of the high density material 52 functions as a mass M is constituted, and, when viewing the driving seat side sound insulating section 44 as a whole, it can be considered that a plurality of vibration systems V are arranged in parallel with one another along the dash panel 20. The vibration systems V are excited by noise W from the power unit room 16, and a portion of energy that the noise W has is converted to mechanical energy of the vibration systems V.

Resistance force due to self-weight (gravitational acceleration) and the like of the high density material 52 is exerted on the vibration systems V, and vibration of the vibration systems V excited by the energy, which the noise W has, is attenuated by the resistance force. As a result, absorption performance of the noise W can be increased with regard to the portion on the driving seat side of the dash panel 20, as a result of which the noise W can be suppressed from leaking via the opening section 34 of the instrument panel 14.

In addition, in the embodiment, the high density material 52 is arranged to a portion of the dash panel 20 positioned further on the vehicle lower side than the opening section 34 of the instrument panel 14. This arrangement enables a ratio of a portion that can receive the noise W transmitted to a vicinity of the opening section 34 of the instrument panel 14 to the whole of the high density material 52 to be increased to a greater value than that for a configuration in which the high density material 52 is arranged along the whole of the surface on the vehicle rear side of the dash panel 20.

The front passenger seat side sound insulating section 46 is configured with sound absorbing materials that are arranged along a portion on the front passenger seat side of the dash panel 20, as illustrated in FIG. 3. The number of sheets of sound absorbing materials that constitute the front passenger seat side sound insulating section 46 and that are arranged in the plate thickness direction of the dash panel 20 is set at a number less than or equal to the number of sheets of sound absorbing materials that constitute the driving seat side sound insulating section 44 and that are arranged in the same manner. Thus, at the portion on the front passenger seat side of the dash panel 20, it is possible, while securing a certain level of sound insulation performance, to make the configuration of the front passenger seat side sound insulating section 46 simpler than the configuration of the driving seat side sound insulating section 44. Therefore, in the embodiment, it is possible, while suppressing noise in the vehicle interior 12 from occurring, to suppress excessive quality from being produced, by appropriately arranging members used for sound insulation.

In the embodiment, the front passenger seat side sound insulating section 46 is configured with the first front passenger seat side sound absorbing material 48B, which is closely attached to the surface on the vehicle rear side of the dash panel 20, and the second front passenger seat side sound absorbing material 50B, which is closely attached to the surface on the vehicle rear side of the first front passenger seat side sound absorbing material 48B. Thus, it is possible to increase absorption performance of noise by the front passenger seat side sound insulating section 46 to a higher level than that by a configuration in which the front passenger seat side sound insulating section 46 is configured with one sheet of sound absorbing material.

The driving seat side sound insulating section 44 includes the rear side sound absorbing material 50A, which is arranged along and closely attached to the surface on the vehicle rear side of the high density material 52, as illustrated in FIG. 1, and the rear side sound absorbing material 50A can absorb noise from the power unit room 16 that the driving seat side sound absorbing material 48A and the high density material 52 failed to completely absorb.

In the embodiment, the first front passenger seat side sound absorbing material 48B and the driving seat side sound absorbing material 48A are formed in one body and the second front passenger seat side sound absorbing material 50B and the rear side sound absorbing material 50A are formed in one body. This configuration enables the number of man-hours required for installation of the sound insulating section 42 to be reduced to a smaller number than that by a configuration in which all of the first front passenger seat side sound absorbing material 48B, the driving seat side sound absorbing material 48A, the second front passenger seat side sound absorbing material 50B, and the rear side sound absorbing material 50A are formed as separate bodies. Therefore, in the embodiment, it is possible, while better suppressing noise in the vehicle interior 12 from occurring, to suppress assembly work of the vehicle interior 12 from complicating.

Second Embodiment

Figure 6:
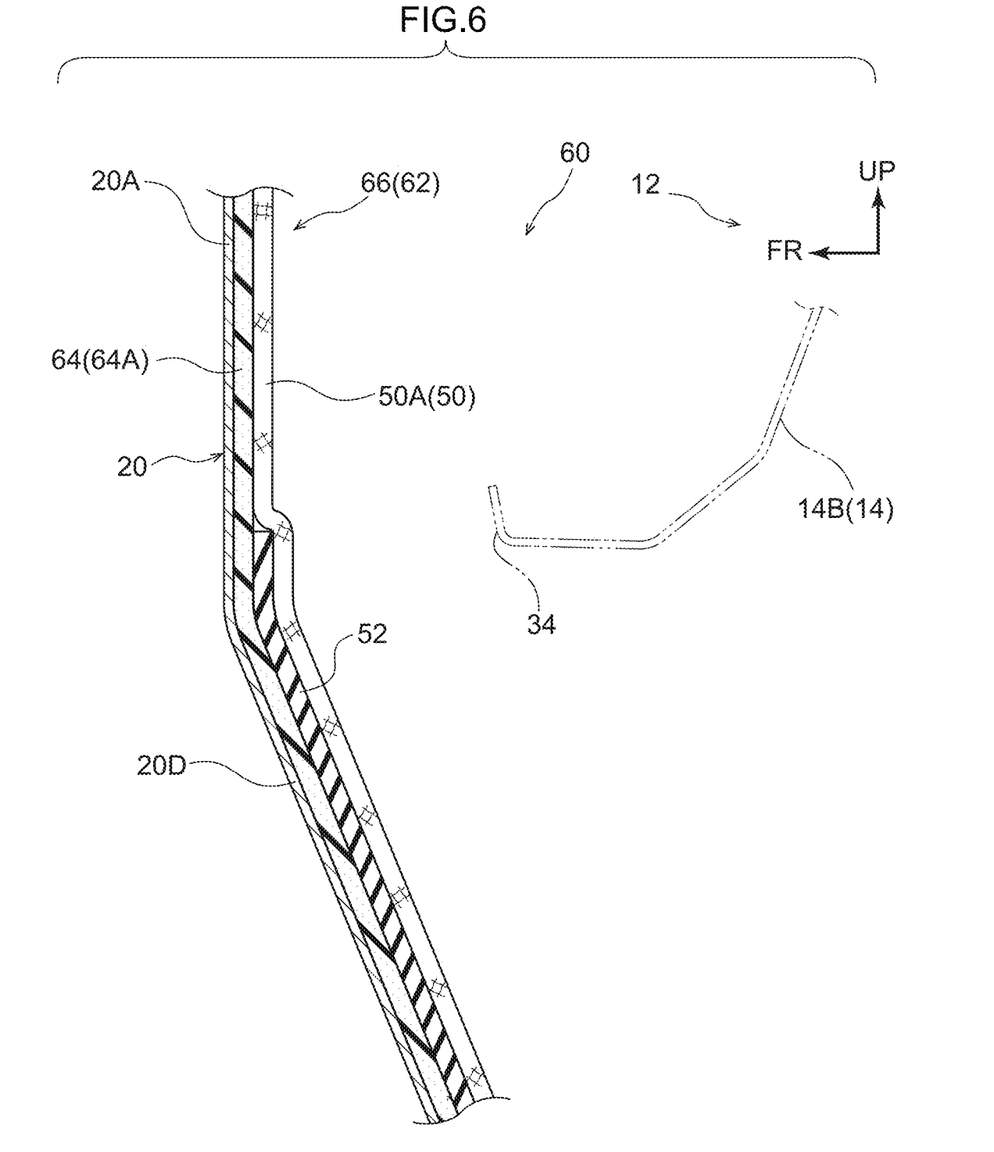
FIG. 6 is an enlarged cross-sectional view (a cross-sectional view corresponding to FIG. 1) viewed from the vehicle width direction illustrating a configuration of a vicinity of a portion on the driving seat side of a dash panel of a vehicle according to a second embodiment.

Hereinafter, a vehicle according to a second embodiment will be described using FIG. 6. The same numbers are assigned to the same constituent components as those in the first embodiment described above, and a description thereof will be omitted.

A vehicle 60 according to the embodiment is characterized by a feature that a first sound absorbing material 64 is made of foam while a sound insulating section 62 basically has the same configuration as the sound insulating section 42.

Specifically, the first sound absorbing material 64 is formed into a shape that can be arranged along substantially the whole of a surface on the vehicle rear side of a dash panel 20 by forming resin foam, such as urethane foam. As resin foam of which the first sound absorbing material 64 is made, resin foam having a lower density than the material of a high density material 52 is used. In the following description, it is assumed that a portion on one side in the vehicle width direction of the first sound absorbing material 64 is referred to as a driving seat side sound absorbing material 64A.

In the embodiment, a portion on one side in the vehicle width direction of the sound insulating section 62, that is, a driving seat side sound insulating section 66, is configured to have a three-layer structure in which the driving seat side sound absorbing material 64A, the high density material 52, and a rear side sound absorbing material 50A are arranged in this order from the side where the dash panel 20 is located. A portion on the other side in the vehicle width direction of the sound insulating section 62 is configured to have a two-layer structure in which a portion on the other side in the vehicle width direction of the first sound absorbing material 64 and a second front passenger seat side sound absorbing material 50B are arranged in this order from the side where the dash panel 20 is located. In the embodiment, the portion on the other side in the vehicle width direction of the sound insulating section 62 functions as a front passenger seat side sound insulating section and, therewith, the portion on the other side in the vehicle width direction of the first sound absorbing material 64 functions as a first front passenger seat side sound absorbing material.

Such a configuration, as with the first embodiment described above, causes vibration systems to be constituted in each of which a minute portion of the driving seat side sound absorbing material 64A functions as a spring and a minute portion of the high density material 52 functions as a mass and enables an operation and advantageous effects that are basically similar to those in the first embodiment described above to be attained.

In addition, in the embodiment, since the driving seat side sound absorbing material 64A is made of formed foam, it is possible to suppress the driving seat side sound absorbing material 64A from collapsing upon installation and the like of the sound insulating section 62 better than a configuration in which the driving seat side sound absorbing material 64A is made of a material such as a fibrous material. Therefore, in the embodiment, it is possible to suppress sound insulation performance of the sound insulating section 62 from being reduced.

Third Embodiment

Figure 7:
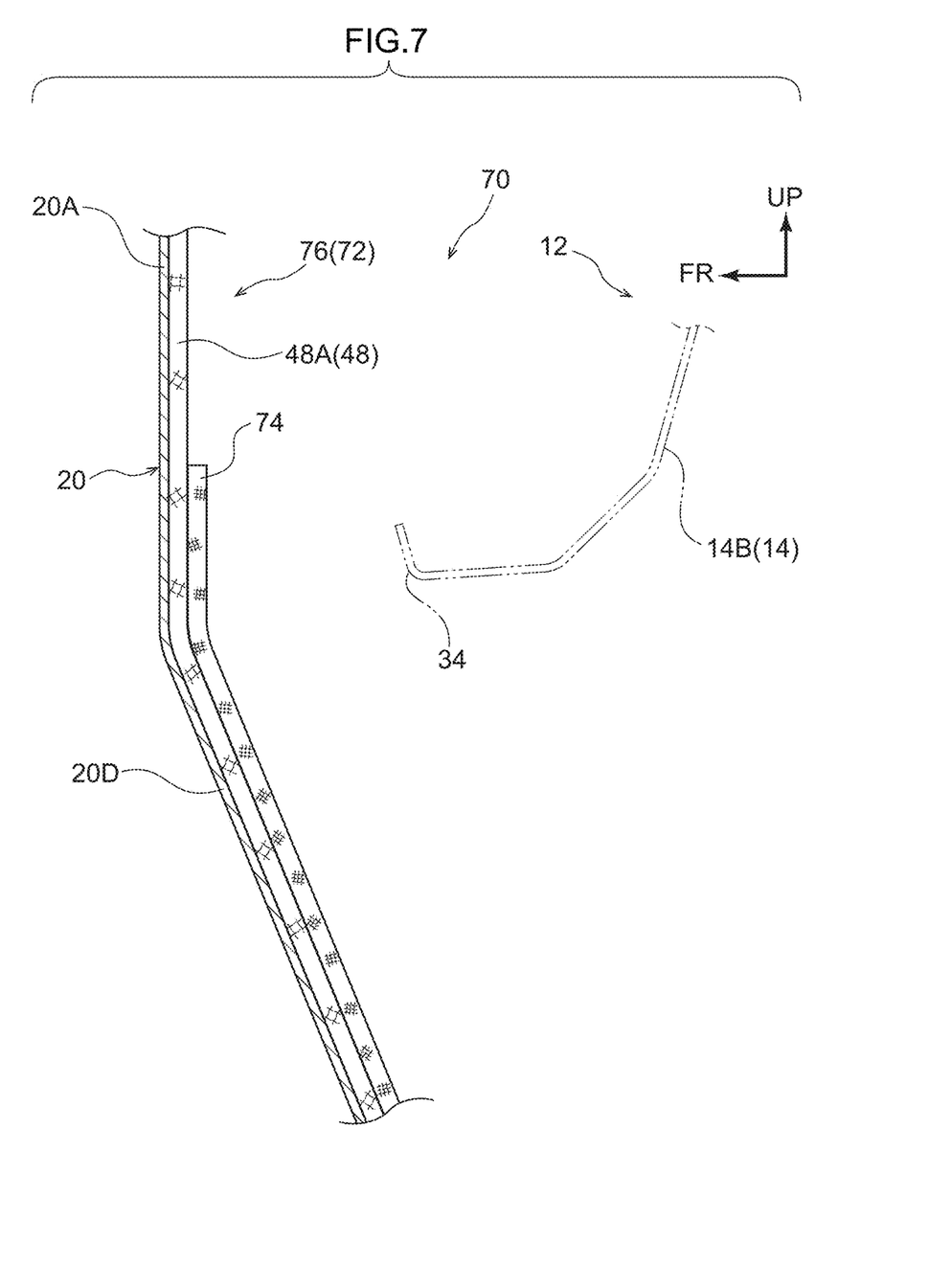
FIG. 7 is an enlarged cross-sectional view (a cross-sectional view corresponding to FIG. 1) viewed from the vehicle width direction illustrating a configuration of a vicinity of a portion on the driving seat side of a dash panel of a vehicle according to a third embodiment.

Hereinafter, a vehicle according to a third embodiment will be described using FIG. 7.

The same numbers are assigned to the same constituent components as those in the first embodiment described above, and a description thereof will be omitted.

A vehicle 70 according to the embodiment, while being basically configured to have a similar configuration to that of the vehicle 10, is characterized by a feature that a sound insulating section 72 does not include the second sound absorbing material 50 and includes, instead of the high density material 52, a high density material 74 that serves as a second driving seat side sound absorbing material and that is made of felt.

Specifically, the high density material 74 is made of felt that has a higher density than felt of which a first sound absorbing material 48 is made and is formed into a shape similar to that of the high density material 52, that is, a shape that can be arranged along substantially the whole of a surface on the vehicle rear side of a lower wall section 20D of a dash panel 20. The high density material 74, while being arranged along and closely attached to a surface on the vehicle rear side of a driving seat side sound absorbing material 48A, is adhered to the driving seat side sound absorbing material 48A by a not-illustrated adhesive or the like. In the embodiment, the driving seat side sound absorbing material 48A functions as a first driving seat side sound absorbing material.

In the embodiment, a portion on one side in the vehicle width direction of the sound insulating section 72, that is, a driving seat side sound insulating section 76, is configured to have a two-layer structure in which the driving seat side sound absorbing material 48A and the high density material 74 are arranged in this order from the side where the dash panel 20 is located. A portion on the other side in the vehicle width direction of the sound insulating section 72 functions as a front passenger seat side sound insulating section and therewith is configured to have a single layer structure that is configured with only a first front passenger seat side sound absorbing material 48B.

Such a configuration, as with the first embodiment described above, causes vibration systems to be constituted in each of which a minute portion of the driving seat side sound absorbing material 48A functions as a spring and a minute portion of the high density material 74 functions as a mass and enables an operation and advantageous effects that are basically similar to those in the first embodiment described above to be attained.

In the embodiment, a main portion of the sound insulating section 72 is made of only felt, as a result of which it is possible to achieve simplification of a configuration of the sound insulating section 72.

In the embodiment, the driving seat side sound insulating section 76 includes the driving seat side sound absorbing material 48A that is closely attached to a surface on the vehicle rear side of the dash panel 20 and the high density material 74 that is closely attached to a surface on the vehicle rear side of the driving seat side sound absorbing material 48A and therewith functions as a sound absorbing material. Thus, adjustment of a thickness of each of the driving seat side sound absorbing material 48A and the high density material 74 enables a frequency band of sound that the driving seat side sound insulating section 76 can absorb to be tuned to a frequency band of noise from a power unit room 16 more easily than in a case that the driving seat side sound insulating section 76 is configured with a sheet of sound absorbing material. Therefore, in the embodiment, it is possible to absorb noise in a vehicle interior 12 over a wide range of frequency band.

Fourth Embodiment

Figure 8:
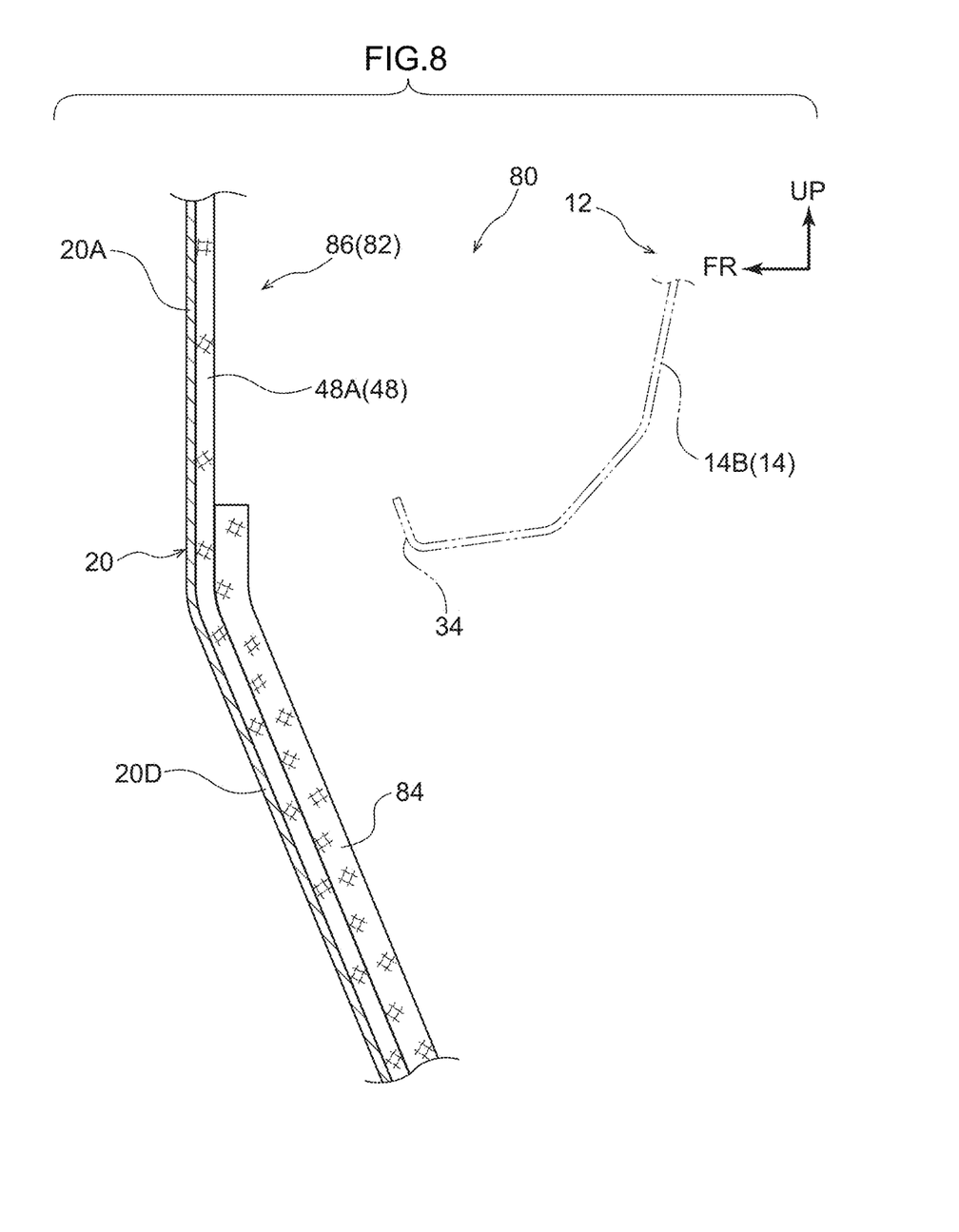
FIG. 8 is an enlarged cross-sectional view (a cross-sectional view corresponding to FIG. 1) viewed from the vehicle width direction illustrating a configuration of a vicinity of a portion on the driving seat side of a dash panel of a vehicle according to a fourth embodiment.

Hereinafter, a vehicle according to a fourth embodiment will be described using FIG. 8. The same numbers are assigned to the same constituent components as those in the first embodiment described above, and a description thereof will be omitted.

A vehicle 80 according to the embodiment, while being basically configured to have a similar configuration to that of the vehicle 10, is characterized by a feature that a sound insulating section 82 does not include the second sound absorbing material 50 and includes, instead of the high density material 52, a sound absorbing material 84.

Specifically, the sound absorbing material 84 is made of felt that has a density approximately as high as that of felt of which a first sound absorbing material 48 is made and is formed into a shape that can be arranged along substantially the whole of a surface on the vehicle rear side of a lower wall section 20D of a dash panel 20. The sound absorbing material 84, while being arranged along and closely attached to a surface on the vehicle rear side of a driving seat side sound absorbing material 48A, is adhered to the driving seat side sound absorbing material 48A by a not-illustrated adhesive or the like. A thickness of the sound absorbing material 84 adhered to the driving seat side sound absorbing material 48A in the plate thickness direction of the dash panel 20 is set at a thickness approximately twice as thick as the first sound absorbing material 48 in the plate thickness direction of the dash panel 20.

In the embodiment, a portion on one side in the vehicle width direction of the sound insulating section 82, that is, a driving seat side sound insulating section 86, is configured to have a two-layer structure in which the driving seat side sound absorbing material 48A and the sound absorbing material 84 are arranged in this order from the side where the dash panel 20 is located. A portion on the other side in the vehicle width direction of the sound insulating section 82 functions as a front passenger seat side sound insulating section and therewith is configured to have a single layer structure that is configured with only a first front passenger seat side sound absorbing material 48B.

Such a configuration causes a thickness of the driving seat side sound insulating section 86 in the plate thickness direction of the dash panel 20 to be set to be thicker than a thickness of the portion on the other side in the vehicle width direction of the sound insulating section 82 in the plate thickness direction of the dash panel 20. Thus, it becomes easier for the driving seat side sound insulating section 86 to absorb sound with a long wavelength, that is, low frequency sound, than for the portion on the other side in the vehicle width direction of the sound insulating section 82, as a result of which it is possible to suppress low frequency noise from leaking from an opening section 34 of an instrument panel 14. In addition, making the portion on the other side in the vehicle width direction of the sound insulating section 82 thinner than the driving seat side sound insulating section 86 enables the amount of sound absorbing material required for constituting the portion on the other side in the vehicle width direction of the sound insulating section 82 to be smaller than the amount of sound absorbing material required for constituting the driving seat side sound insulating section 86. Therefore, in the embodiment, it is possible, while suppressing noise in a vehicle interior 12, particularly low frequency noise, from occurring, to suppress excessive quality from being produced, by appropriately arranging members used for sound insulation.

<Supplementary Explanation of Above Embodiments>

(1) Although, in the first and second embodiments described above, the sound insulating sections 42 and 62 included the second sound absorbing material 50, the invention is not limited to the configuration. For example, the sound insulating sections 42 and 62 may have a configuration that does not include the second sound absorbing material 50 depending on intensity of noise in the vehicle.

(2) Although, in the first to third embodiments described above, a high density material was arranged along substantially the whole of a surface on the vehicle rear side of the lower wall section 20D of the dash panel 20, the invention is not limited to the configuration. For example, the high density material may be arranged along substantially the whole of a surface on the vehicle rear side of a portion on one side in the vehicle width direction (substantially a half on one side in the vehicle width direction) of the dash panel 20 depending on intensity of noise in the vehicle.

(3) Although, in the fourth embodiment described above, the sound absorbing material 84 was arranged along substantially the whole of the surface on the vehicle rear side of the lower wall section 20D of the dash panel 20, the invention is not limited to the configuration. For example, the sound absorbing material 84 may be arranged along substantially the whole of the surface on the vehicle rear side of the portion on one side in the vehicle width direction (substantially a half on one side in the vehicle width direction) of the dash panel 20 depending on intensity of noise in the vehicle.

(4) Although, in the fourth embodiment described above, the sound absorbing material 84 was made of felt having a density approximately as high as that of felt of which the first sound absorbing material 48 is made, the sound absorbing material 84 may be made of felt having a higher density than the felt of which the first sound absorbing material 48 is made depending on intensity of noise in the vehicle.

(5) Although, in the embodiments described above, the sound insulating sections were configured in such a way as to be suited to a right-hand drive vehicle, the sound insulating sections may be configured to be compatible with a left-hand drive vehicle by providing sound insulating sections in the left-hand drive vehicle with a configuration that is symmetric in the vehicle width direction with the one described above.

(6) Although, in the embodiments described above, a first sound absorbing material was configured with a sheet of material that can be arranged along substantially the whole of a surface on the vehicle rear side of the whole of the dash panel 20, the invention is not limited to the configuration. For example, depending on the configuration of the dash panel 20, the first sound absorbing material may be divided in the vehicle width direction or the first sound absorbing material 48 may be divided in the vehicle vertical direction.

What is claimed is:

1. A vehicle comprising:
a dash panel that partitions a power unit room, arranged on a vehicle front side, and a vehicle interior from each other;
an instrument panel that covers the dash panel from a vehicle rear side and at a portion of which, on a driving seat side and a vehicle lower side, an opening section through which an arm section of a pedal is insertable is formed; and
a sound insulating section that is installed along a surface on the vehicle rear side of the dash panel,
wherein
the sound insulating section includes:
a driving seat side sound insulating section that is configured including a driving seat side sound absorbing material that is arranged along a portion on the driving seat side of the dash panel and is made of an elastically deformable material, and a high density material that is arranged along and closely attached to a surface on the vehicle rear side of the driving seat side sound absorbing material and is made of a material that has a higher density than the material of the driving seat side sound absorbing material, and
a front passenger seat side sound insulating section that is configured with one or more sound absorbing materials that are arranged along a portion on a front passenger seat side of the dash panel, wherein a number of sheets of the sound absorbing materials arranged in a plate thickness direction of the dash panel is set at a number less than or equal to a number of sheets of sound absorbing materials included in the driving seat side sound insulating section,
the driving seat side sound insulating section includes an upper portion and a lower portion, and
the high density material is arranged in the lower portion, but not in the upper portion.

2. The vehicle according to claim 1, wherein:
the front passenger seat side sound insulating section is configured with a first front passenger seat side sound absorbing material that is closely attached to the surface on the vehicle rear side of the dash panel and a second front passenger seat side sound absorbing material that is closely attached to a surface on the vehicle rear side of the first front passenger seat side sound absorbing material,
the driving seat side sound insulating section further includes a rear side sound absorbing material that is arranged along and closely attached to a surface on the vehicle rear side of the high density material,
the first front passenger seat side sound absorbing material is formed in one body with the driving seat side sound absorbing material, and
the second front passenger seat side sound absorbing material is formed in one body with the rear side sound absorbing material.

3. The vehicle according to claim 1, wherein:
the driving seat side sound absorbing material is made of formed foam.

4. A vehicle comprising:
a dash panel that partitions a power unit room, arranged on a vehicle front side, and a vehicle interior from each other;
an instrument panel that is arranged on a vehicle rear side of the dash panel and at a portion of which, on a driving seat side and a vehicle lower side, an opening section through which an arm section of a pedal is insertable is formed; and
a sound insulating section that is installed along a surface on the vehicle rear side of the dash panel,
wherein
the sound insulating section includes:

a front passenger seat side sound insulating section that is configured with a sound absorbing material arranged along a portion on a front passenger seat side of the dash panel, and a driving seat side sound insulating section that is configured with a sound absorbing material arranged along a portion on the driving seat side of the dash panel and a thickness of which in a plate thickness direction of the dash panel is set to be thicker than the front passenger seat side sound insulating section, the driving seat side sound insulating section includes an upper portion and a lower portion, and a thickness of the sound absorbing material in the lower portion is greater than in the upper portion.

5. The vehicle according to claim 1, wherein the driving seat side sound insulating section includes:

a first driving seat side sound absorbing material that is closely attached to the surface on the vehicle rear side of the dash panel and that is made of an elastically deformable material; and a second driving seat side sound absorbing material that is closely attached to a surface on the vehicle rear side of the first driving seat side sound absorbing material and that is made of a material that has a higher density than the material of the first driving seat side sound absorbing material.

6. The vehicle according to claim 1, wherein:

the front passenger seat side sound insulating section comprises a first front passenger seat side sound absorbing material attached to the surface on the vehicle rear side of the dash panel, and a second front passenger seat side sound absorbing material attached to a surface on the vehicle rear side of the first front passenger seat side sound absorbing material, the driving seat side sound insulating section further includes a rear side sound absorbing material, the first front passenger seat side sound absorbing material is formed in one body with the driving seat side sound absorbing material, the second front passenger seat side sound absorbing material is formed in one body with the rear side sound absorbing material, and in the driving seat side sound insulating section, the high density material is sandwiched, in the plate thickness direction of the dash panel, between the driving seat side sound absorbing material, and the rear side sound absorbing material.

7. The vehicle according to claim 6, wherein:

the upper portion of the driving seat side sound insulating section corresponds to a housing from which the arm section of the pedal extends, the lower portion of the driving seat side sound insulating section corresponds to the arm section of the pedal, in the upper portion, the rear side sound absorbing material is attached to the surface on the vehicle rear side of the driving seat side sound absorbing material, and in the lower portion, the rear side sound absorbing material is attached to a surface on the vehicle rear side of the high density material.

8. The vehicle according to claim 7, wherein:

the driving seat side sound absorbing material comprises formed foam, and the high density material comprises a resin material.

9. The vehicle according to claim 1, wherein:

the high density material comprises felt.

10. A vehicle, comprising:

a dash panel that partitions a power unit room, arranged on a vehicle front side, and a vehicle interior from each other;

an instrument panel that covers the dash panel from a vehicle rear side and at a portion of which, on a driving seat side and a vehicle lower side, an opening section through which an arm section of a pedal is insertable is formed; and a sound insulating section that is installed along a surface on the vehicle rear side of the dash panel, wherein the sound insulating section includes:

a driving seat side sound insulating section that is configured including a driving seat side sound absorbing material that is arranged along a portion on the driving seat side of the dash panel and is made of an elastically deformable material, and a high density material that is arranged along and closely attached to a surface on the vehicle rear side of the driving seat side sound absorbing material and is made of a material that has a higher density than the material of the driving seat side sound absorbing material, and a front passenger seat side sound insulating section that is configured with one or more sound absorbing materials that are arranged along a portion on a front passenger seat side of the dash panel, wherein a number of sheets of the sound absorbing materials arranged in a plate thickness direction of the dash panel is set at a number less than or equal to a number of sheets of sound absorbing materials included in the driving seat side sound insulating section, the front passenger seat side sound insulating section is configured with a first front passenger seat side sound absorbing material that is closely attached to the surface on the vehicle rear side of the dash panel and a second front passenger seat side sound absorbing material that is closely attached to a surface on the vehicle rear side of the first front passenger seat side sound absorbing material, the driving seat side sound insulating section further includes a rear side sound absorbing material that is arranged along and closely attached to a surface on the vehicle rear side of the high density material, the first front passenger seat side sound absorbing material is formed in one body with the driving seat side sound absorbing material, and the second front passenger seat side sound absorbing material is formed in one body with the rear side sound absorbing material.

* * * * *